US007397526B2

(12) United States Patent
Kitson et al.

(10) Patent No.: US 7,397,526 B2
(45) Date of Patent: * Jul. 8, 2008

(54) LIQUID CRYSTAL DEVICE COMPRISING ALIGNMENT POSTS HAVING A RANDOM OR PSEUDORANDOM SPACING THEREBETWEEN

(75) Inventors: Stephen Christopher Kitson, South Gloucestershire (GB); Adrian Derek Geisow, N. Somerset (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/816,941

(22) Filed: Mar. 23, 2001

(65) Prior Publication Data

US 2001/0024256 A1 Sep. 27, 2001

(30) Foreign Application Priority Data

Mar. 27, 2000 (EP) ................................. 00302478

(51) Int. Cl.
*G02F 1/1337* (2006.01)
(52) U.S. Cl. ...................... 349/123; 349/130; 349/132
(58) Field of Classification Search ......... 349/123–125, 349/128–130, 132, 191, 92
See application file for complete search history.

(56) References Cited

U.S. PATENT DOCUMENTS

| 4,232,947 | A | * | 11/1980 | Funada et al. ............... 349/123 |
| 4,333,708 | A | | 6/1982 | Boyd et al. |
| 4,893,907 | A | | 1/1990 | Mallinson ................. 350/350 S |
| 4,996,123 | A | * | 2/1991 | Nomura et al. ................ 430/20 |
| 5,109,293 | A | * | 4/1992 | Matsunaga et al. .......... 349/189 |
| 5,327,271 | A | | 7/1994 | Takeuchi et al. .............. 359/75 |
| 5,552,611 | A | | 9/1996 | Enichen .................... 250/491.1 |
| 5,574,593 | A | | 11/1996 | Wakita et al. ................. 35/259 |
| 5,751,382 | A | | 5/1998 | Yamada et al. ................ 349/12 |
| 5,754,264 | A | * | 5/1998 | Bryan-Brown et al. ...... 349/123 |
| 5,872,611 | A | | 2/1999 | Hirata et al. ................. 349/147 |
| 5,917,570 | A | * | 6/1999 | Bryan-Brown et al. ...... 349/129 |
| 6,067,141 | A | | 5/2000 | Yamada et al. .............. 349/129 |
| 6,236,445 | B1 | | 5/2001 | Foschaar et al. ............ 349/156 |
| 6,266,122 | B1 | * | 7/2001 | Kishimoto et al. .......... 349/156 |
| 6,327,016 | B1 | * | 12/2001 | Yamada et al. .............. 349/160 |
| 6,456,348 | B2 | * | 9/2002 | Bryan-Brown et al. ...... 349/129 |

(Continued)

FOREIGN PATENT DOCUMENTS

EP 000768560 4/1997

(Continued)

OTHER PUBLICATIONS

Robert N. Thurston, et al., "Mechanically Bistable Liquid-Crystal Display Structures", IEEE Trans. Electronic Devices, pp. 2069-2080, 1980.

(Continued)

*Primary Examiner*—Thoi V. Duong

(57) ABSTRACT

A liquid crystal device has a surface alignment structure comprising an array of alignment features (10) which are shaped and/or orientated to produce a desired alignment. Depending on the geometry and spacing of the features (10), the liquid crystal may be induced to adopt a planar, tilted, or homeotropic alignment.

44 Claims, 11 Drawing Sheets

U.S. PATENT DOCUMENTS

| | | | | |
|---|---|---|---|---|
| 6,519,018 | B1 * | 2/2003 | Samant et al. | 349/130 |
| 6,549,256 | B1 * | 4/2003 | Bryan-Brown et al. | 349/128 |
| 6,690,440 | B1 | 2/2004 | Nishiyama et al. | 349/129 |
| 6,714,273 | B2 | 3/2004 | Bryan-Brown et al. | 349/129 |
| 2005/0062919 | A1 | 3/2005 | Bryan-Brown et al. | 349/123 |

FOREIGN PATENT DOCUMENTS

| | | | |
|---|---|---|---|
| EP | 1 094 103 | | 4/2001 |
| GB | 2 286 467 | | 8/1995 |
| GB | 2290629 | A | 1/1996 |
| JP | 56138712 | | 10/1981 |
| JP | 02211422 | | 8/1990 |
| JP | 05053513 | | 3/1993 |
| JP | 05088177 | | 4/1993 |
| JP | 5-249463 | * | 9/1993 |
| JP | 10148827 | | 6/1998 |
| JP | 11311789 | | 11/1999 |
| JP | 2000206535 | | 7/2000 |
| WO | WO 91/11747 | | 8/1991 |
| WO | WO 92/00546 | | 1/1992 |
| WO | WO 96/24880 | | 8/1996 |
| WO | WO 97/14990 | | 4/1997 |
| WO | WO 99/34251 | | 7/1999 |
| WO | WO 01/40853 | | 6/2001 |

OTHER PUBLICATIONS

Yamamoto et al., "Pretilt angle control of liquid-crystal alignment by using projections on substrate surfaces for dual-domain TN-LCD", *J. SID*, Apr. 2, 1996.

Cognard, "Alignment of Nematic Liquid Crystals and Their Mixtures", *Mol. Cryst. Liq. Cryst.* 1-78 (1982) Supplement 1.

Berreman, "The Alignment of Liquid Crystals by Grooved Surfaces",*Mol. Cryst. Liq. Cryst.* vol. 23, p. 215-231 1973.

Cheng et al., "The liquid crystal alignment properties of photolithographic gratings",*Appl. Phys. Lett.* 35(6), Sep. 15, 1979.

Bryan-Brown et al., "Weak surface anchoring of liquid crystals", *Nature* vol. 399, p. 338 1999.

Lien et al., "Active-matrix display using ion-beam-processed polyimide film for liquid crystal alignment", *IBM Journal of Research and Development*, vol. 42, Nos. ¾, 1998.

J. Cognard, *Alignment of Liquid Crystals*, section III.2.3, p. 67.

* cited by examiner

LIQUID CRYSTAL DEVICE COMPRISING ALIGNMENT POSTS HAVING A RANDOM OR PSEUDORANDOM SPACING THEREBETWEEN

FIELD OF THE INVENTION

The present invention relates to alignment of liquid crystals in liquid crystal devices.

BACKGROUND OF THE INVENTION

Liquid crystal (LC) materials are rod-like or lath-like molecules which have different optical properties along their long and short axes. The molecules exhibit some long range order so that locally they tend to adopt similar orientations to their neighbours. The local orientation of the long axes of the molecules is referred to as the "director". There are three types of LC materials: nematic, cholesteric (chiral nematic), and smectic. For a liquid crystal to be used in a display device, it must typically be made to align in a defined manner in the "off" state and in a different defined manner in the "on" state, so that the display has different optical properties in each state. Two principal alignments are homeotropic (where the director is substantially perpendicular to the plane of the cell walls) and planar (where the director is inclined substantially parallel to the plane of the cell walls). In practice, planar alignments may be tilted with respect to the plane of a cell wall, and this tilt can be useful in aiding switching. The present invention is concerned with alignment in liquid crystal displays.

Hybrid Aligned Nematic (HAN), Vertical Aligned Nematic (VAN), Twisted nematic (TN) and super-twisted nematic (STN) cells are widely used as display devices in consumer and other products. The cells comprise a pair of opposed, spaced-apart cell walls with nematic liquid crystal material between them. The walls have transparent electrode patterns that define pixels between them.

In TN and STN displays, the inner surface of each wall is treated to produce a planar unidirectional alignment of the nematic director, with the alignment directions being at 90° to each other. This arrangement causes the nematic director to describe a quarter helix within the TN cell, so that polarised light is guided through 90° when a pixel is in the "field off" state. In an STN cell, the nematic liquid crystal is doped with a chiral additive to produce a helix of shorter pitch which rotates the plane of polarisation in the "field off" state. The "field off" state may be either white or black, depending on whether the cell is viewed through crossed or parallel polarisers. Applying a voltage across a pixel causes the nematic director to align normal to the walls in a homeotropic orientation, so that the plane of polarised light is not rotated in the "field on" state.

In a HAN cell, one wall is treated to align a nematic LC in a homeotropic alignment and the other wall is treated to induce a planar alignment, typically with some tilt to facilitate switching. The LC has positive dielectric anisotropy, and application of an electric field causes the LC directors to align normal to the walls so that the cell switches from a birefringent "field off" state to a non-birefringent "field on" state.

In the VAN mode, a nematic LC of negative dielectric anisotropy is homeotropically aligned in the "field off" state, and becomes birefringent in the "field on" state. A dichroic dye may be used to enhance contrast.

Liquid crystal (LC) planar alignment is typically effected by the unidirectional rubbing of a thin polyimide alignment layer on the interior of the LC cell, which gives rise to a unidirectional alignment with a small pretilt angle. It has been proposed to increase the pretilt angle for a rubbed surface by incorporating small projections in the rubbed alignment layer, in "Pretilt angle control of liquid-crystal alignment by using projections on substrate surfaces for dual-domain TN-LCD" T. Yamamoto et al, J. SID, Apr. 2, 1996.

Whilst having a desirable effect on the optical characteristics of the device, the rubbing process is not ideal as this requires many process steps, and high tolerance control of the rubbing parameters is needed to give uniform display substrates. Moreover, rubbing may cause static and mechanical damage of active matrix elements which sit under the alignment layer. Rubbing also produces dust, which is detrimental to display manufacture.

Photoalignment techniques have recently been introduced whereby exposure of certain polymer coating to polarised UV light can induce planar alignment. This avoids some of the problems with rubbing, but the coatings are sensitive to LC materials, and typically produce only low pre-tilt angles.

An alternative is to use patterned oblique evaporation of silicon oxide (SiO) to form the alignment layer.

This also effects a desired optical response; however the process is complicated by the addition of vacuum deposition and a lithography process. Moreover, control of process parameters for SiO evaporation is critical to give uniformity, which is typically difficult to achieve over large areas.

A useful summary of methods of aligning liquid crystals is given in "Alignment of Nematic Liquid Crystals and Their Mixtures", J. Cognard, Mol. Cryst. Liq. Cryst. 1-78 (1982) Supplement 1.

The use of surface microstructures to align LCs has been known for many years, for example as described in "The Alignment of Liquid Crystals by Grooved Surfaces" D. W. Berriman, Mol. Cryst. Liq. Cryst. 23 215-231 1973.

It is believed that the mechanism of planar alignment involves the LC molecules aligning along the grooves to minimise distortion energy derived from deforming the LC material. Such grooves may be provided by a monograting formed in a photoresist or other suitable material.

It has been proposed in GB 2 286 467 to provide a sinusoidal bigrating on at least one cell wall, by exposing a photopolymer to an interference pattern of light generated by a laser. The bigrating permits the LC molecules to lie in two different planar angular directions, for example 45° or 90° apart. An asymmetric bigrating structure can cause tilt in one or both angular directions. Other examples of alignment by gratings are described in WO 96/24880, WO 97/14990 WO 99/34251, and "The liquid crystal alignment properties of photolithographic gratings", J. Cheng and G. D. Boyd, *Appl. Phys. Lett*. 35(6) Sep. 15, 1979. In "Mechanically Bistable Liquid-Crystal Display Structures", R. N. Thurston et al, IEEE trans. on Electron Devices, Vol. ED-27 No 11, November 1980, LC planar alignment by a periodic array of square structures is theorised.

LC homeotropic alignment is also a difficult process to control, typically using a chemical treatment of the surface, such as lecithin or a chrome complex. These chemical treatments may not be stable over time, and may not adhere very uniformly to the surface to be treated. Homeotropic alignment has been achieved by the use of special polyimide resins (Japan Synthetic Rubber Co). These polyimides need high temperature curing which may not be desirable for low glass transition plastic substrates. Inorganic oxide layers may induce homeotropic alignment if deposited at suitable angles. This requires vacuum processes which are subject to the problems discussed above in relation to planar alignment. Another possibility for producing homeotropic alignment is to use a low surface energy material such as PTFE. However, PTFE gives only weak control of alignment angle and may be difficult to process.

It is desirable to have a more controllable and manufacturable alignment for LC devices.

SUMMARY OF THE INVENTION

We have surprisingly found that the orientation of the director is induced principally by the geometry of surface features in an array, rather than by the array or lattice itself. This is counter to what has been assumed so far in this field.

Accordingly, a first aspect of the present invention provides a liquid crystal device comprising a first cell wall and a second cell wall enclosing a layer of liquid crystal material; electrodes for applying an electric field across at least some of the liquid crystal material; and a surface alignment structure on the inner surface of at least the first cell wall providing a single desired alignment to the liquid crystal director, wherein the said surface alignment structure comprises a two dimensional array of upstanding features which are shaped and/or orientated to produce the desired alignment; but not including any device in which the surface alignment structure comprises a sinusoidal bigrating.

Other aspects of the invention provide a cell wall for use in manufacturing the device, methods of manufacturing the cell wall, and a method of manufacturing the device.

In a preferred embodiment, the features comprise a plurality of upstanding posts. The features could also comprise mounds, pyramids, domes, walls and other promontories which are shaped and/or orientated to permit the LC director to adopt a desired alignment for a particular display mode. The invention will be described for convenience hereinafter with respect to posts; however it is to be understood that the invention is not limited to this embodiment. The posts may have substantially straight sides, either normal or tilted with respect to the major planes of the device, or the posts may have curved or irregular surface shape or configuration. For example, the cross section of the posts may be triangular, square, circular, elliptical or polygonal. Each post is preferably a discrete structure, but neighbouring posts could be connected together by webs of material at their bases as a results of their manufacturing process.

A post deforms an LC director. That deformation propagates through the cell to define an overall alignment. In general that alignment will be in one or more discrete azimuthal directions and in addition there may be one or more tilt values.

The azimuthal alignment directions are determined by the shape of the post. For a square post there are two such directions, along the two diagonals. For a triangular cross-section there are three directions. For other shapes there may be more than three. The orientation of the posts with respect to the cell fixes the stable azimuthal alignment directions. If there is more than one stable azimuthal direction then one or more of them can be favoured by suitable adjustment of the shape. For example, tilting square posts can favour one of the diagonals. Tilting a triangular post in a suitable direction may favour two of the three possible directions.

An oval or diamond shape, with one axis substantially longer than the others, may induce a single local director orientation which defines the azimuthal direction. Similarly, tilting of a cylindrical post can induce an alignment in the tilt direction. It will be appreciated that such an orientation can be induced by a very wide range of post shapes.

In addition to the azimuthal directions the posts can induce well defined tilt angles. A short post will tend to induce planar alignment. We also find that taller posts tend to induce a tilted alignment. Tall thin posts tend to induce high tilts away from the surface and in the limit result in substantially homeotropic alignment. This homeotropic alignment often tends to be tilted away from the cell wall normal in the plane containing the cell wall normal and the preferred azimuthal alignment direction. This tilt angle can be tuned by suitably adjusting the post shape, size and direction of at least one of the post walls.

For intermediate post heights we have found that there are two stable alignments which differ in their tilt angle but have the same azimuthal alignment direction. We refer to this as the "Post Aligned Bistable Nematic" (PABN) mode.

The term "azimuthal direction" is used herein as follows. Let the walls of a cell lie in the x,y plane, so that the normal to the cell walls is the z axis. Two tilt angles in the same azimuthal direction means two different director orientations in the same x,z plane, where x is taken as the projection of the director onto the x,y plane.

By providing a plurality of upstanding tall or thin posts on at least the first cell wall, the liquid crystal molecules can be induced to adopt a state in which the director is substantially parallel to the plane of the local surface of the posts, and normal to the plane of the cell walls. The more closely packed the posts, the more the alignment will tend to be normal to the plane of the cell walls.

If the posts are perpendicular to the cell walls and relatively closely packed, the LC may be substantially homeotropically aligned at 90° to the plane of the cell walls. However, for some applications it is desirable to achieve a homeotropic alignment which is tilted by a few degrees. This may readily be achieved by using tall posts which are spaced further apart from each other and/or which are inclined from the perpendicular. As the posts are inclined more, the average LC tilt angle from the normal will increase. The invention therefore provides a simple way of inducing LC homeotropic alignment with any preferred tilt angle. The term "tilted homeotropic" is used herein to refer to an alignment of the liquid crystal director at a non-zero angle of up to 45° to the perpendicular to the plane of the first cell wall.

By providing posts of suitable dimensions and spacing, a wide range of alignment directions, planar, tilted and homeotropic, can easily be achieved, and various aspects of the invention may therefore be used in desired LC display modes.

The preferred height for the posts will depend on factors such as the desired alignment and the cell gap. A typical height range is around 0.5 to 5 μm, notably 1.0 to 1.2 μm for bistable alignments (assuming a 3 μm cell gap) and taller for tilted homeotropic and homeotropic alignments.

Because the local director orientation is determined by the geometry of the posts, the array need not be a regular array. In a preferred embodiment, the posts are arranged in a random or pseudorandom array instead of in a regular lattice. This arrangement has the benefit of eliminating diffraction colours which may result from the use of regular structures. Such an array can act as a diffuser, which may remove the need for an external diffuser in some displays. Of course, if a diffraction colour is desired in the display, the array may be made regular, and the posts may be spaced at intervals which produce the desired interference effect. Thus, the structure may be separately optimised to give the required alignment and also to mitigate or enhance the optical effect that results from a textured surface.

In a preferred embodiment, the upstanding features are formed from a photoresist material or a plastics material.

The posts may be formed by any suitable means; for example by photolithography, embossing, casting, injection moulding, or transfer from a carrier layer. Embossing into a plastics material is desirable because this permits the posts to be formed simply and at low cost. Suitable plastics materials will be well known to those skilled the art, for example poly(methyl methacrylate).

When exposing a photoresist, a desired post tilt angle can readily be achieved by exposing the photoresist through a suitable mask with a light source at an angle related to the desired angle by Snell's law as is known to allow for the refractive index of the photoresist material.

The preferred height for the posts will depend on factors such as the cell thickness, the thickness and number of the posts, and the LC material. For homeotropic alignment, the posts preferably have a vertical height which is at least equal to the average post spacing. Some or all of the posts may span the entire cell, so that they also function as spacers.

It is preferred that one electrode structure (typically a transparent conductor such as indium tin oxide) is provided on the inner surface of each cell wall in known manner. For example, the first cell wall may be provided with a plurality of "row" electrodes and the second cell wall may be provided with a plurality of "column" electrodes. However, for some display modes it would also be possible to provided planar (interdigitated) electrode structures on one wall only, preferably the first cell wall.

The cell walls are preferably spaced apart from each other by a cell gap which is less than 15 μm, notably by a gap which is less than 5 μm.

The inner surface of the second cell wall could have low surface energy so that it exhibits little or no tendency to cause any particular type of alignment, so that the alignment of the director is determined essentially by the features on the first cell wall. However, it is preferred that the inner surface of the second cell wall is provided with a surface alignment to induce a desired alignment of the local director. This alignment may be homeotropic, planar or tilted. The alignment may be provided by an array of features of suitable shape and/or orientation, or by conventional means, for example rubbing, photoalignment, a monograting, or by treating the surface of the wall with an agent to induce homeotropic alignment.

For planar and tilted alignments, the shape of the features is preferably such as to favour only one azimuthal director orientation adjacent the features. The orientation may be the same for each feature, or the orientation may vary from feature to feature so as to give a scattering effect in one of the two states.

Alternatively, the shape of the features may be such as to give rise to a plurality of stable azimuthal director orientations. Such alignments may be useful in display modes such as bistable twisted nematic (BTN) modes. These aziumthal director orientations may be of substantially equal energy (for example vertical equilateral triangular posts will give three azimuthal alignment directions of equal energy) or one or more alignment directions may be of different energy so that although one or more lower energy alignments are favoured, at least one other stable azimuthal alignment is possible. Such alignments may result from a post shape which has two major axes that differ by a small amount, for example a square which is distorted to a kite shape, or an ellipse which is close to being circular. Alternatively, such alignments may result from orientation of posts (for example, square posts) on a regular lattice so that the major axes of the cross section of the posts are not orientated exactly in line with lattice axes or at 45° to those axes, but rather at some intermediate angle, so that the small orientation effect of the lattice favours one azimuthal alignment over another, but wherein the energy difference is relatively small so that stable director alignment along either azimuthal direction is possible.

The liquid crystal device will typically be used as a display device, and will be provided with means for distinguishing between switched and unswitched states, for example polarisers or a dichroic dye.

The cell walls may be formed from a non-flexible material such as glass, or from rigid or flexible plastics materials which will be well known to those skilled in the art of LC display manufacture, for example poly ether sulphone (PES), poly ether ether ketone (PEEK), or poly(ethylene terephthalate) (PET).

For many displays, it is desirable to have a uniform alignment throughout the field of view. For such displays, the posts may all be of substantially the same shape, size, orientation and tilt angle. However, where variation in alignment is desired these factors, or any of them, may be varied to produced desired effects. For example, the posts may have different orientations in different regions where different alignment directions are desired. A TN cell with quartered subpixels is an example of a display mode which requires such different orientations. If the dimensions of the posts are varied, the strengths of interactions with the LC will vary, and may provide a greyscale. Similarly, variation of the shape of the posts will vary the strength of interaction with the LC.

The features may optionally be provided on both walls to provide a desired local director alignment in the region of both walls. Different features may be provided on each wall, and the features may be independently varied in different regions of each wall depending on the desired alignment.

BRIEF DESCRIPTION OF THE DRAWINGS

The invention will now be further described by way of example, with reference to the following drawings in which.

DETAILED DESCRIPTION

Figure 2:
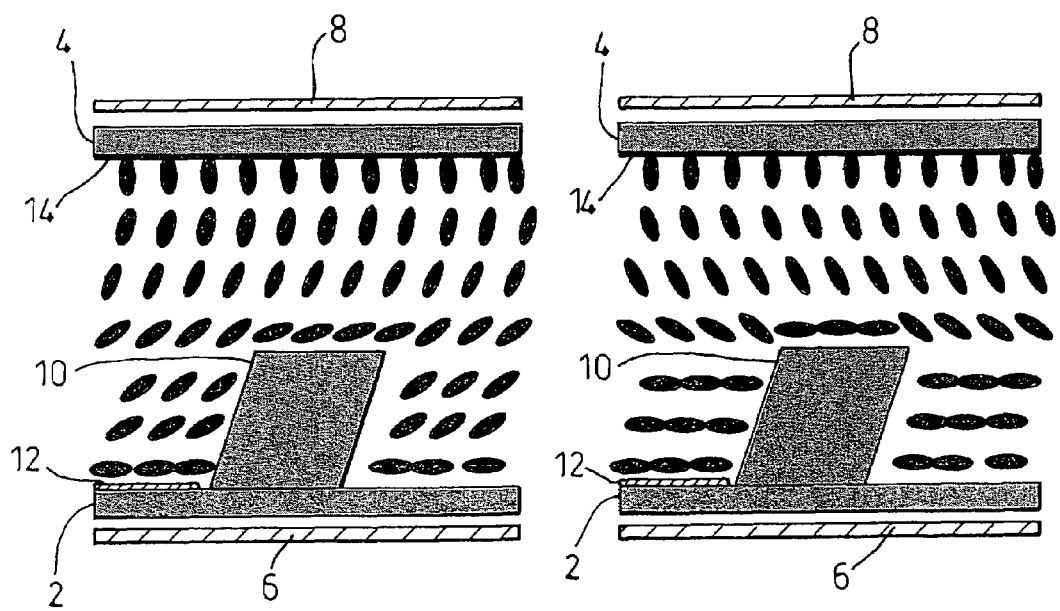
FIG. 2 shows schematic views of a cross section through a single post and the surrounding LC of a bistable nematic device in accordance with one aspect of the present invention, along one of the diagonals of a post, in different states.

The bistable nematic cell shown schematically in FIG. 2 comprises a first cell wall 2 and a second cell wall 4 which enclose a layer of nematic LC material of negative dielectric anisotropy. The molecules of the LC are represented as ellipses, with the long axis indicating the local director. The inner surface of each cell wall is provided with a transparent electrode pattern, for example row electrodes 12 on the first cell wall 2 and column electrodes 14 on the second cell wall 4, in a known manner.

The inner surface of the first cell wall 2 is textured with a regular array of square posts 10, and the inner surface of the second cell wall 4 is flat. The posts 10 are approximately 1 μm high and the cell gap is typically 3 μm. The flat surface is treated to give homeotropic alignment. The posts are not homeotropically treated.

Figure 1:
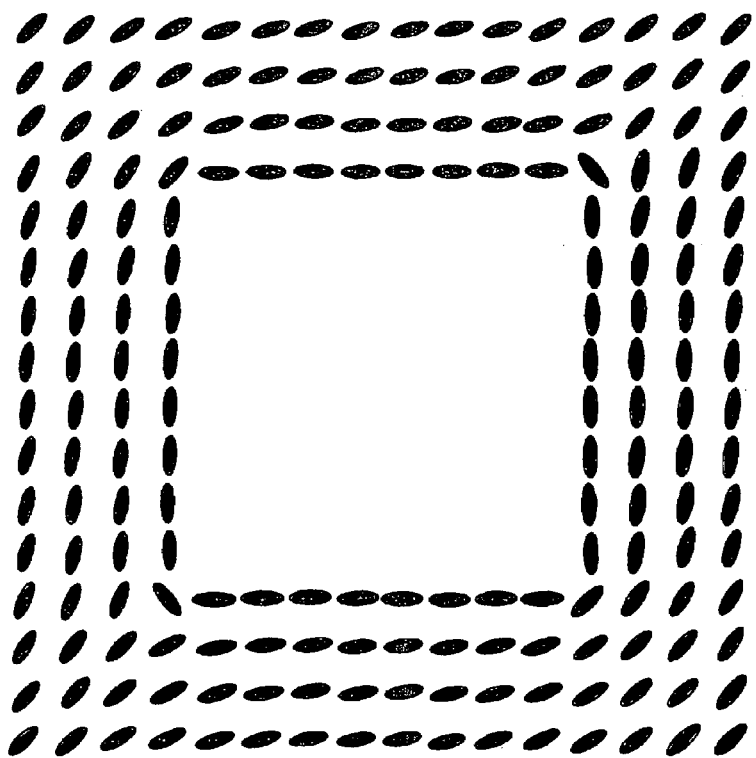
FIG. 1 is a schematic cross section through a single post and the surrounding LC in accordance with the present invention. The cross section is in the x,y plane. The ellipses represent the LC molecules with the long axis corresponding to the local director.

Such an array of square posts has two preferred azimuthal alignments, along the two diagonals of the post. FIG. 1 shows a cross-section through a post with the LC distorted around it, from one corner to the diagonally opposite one. This alignment around the post then tends to seed the alignment of the LC above the post such that the average orientation is also along that diagonal.

By tilting the posts along one of the diagonals (FIG. 2) it is possible to favour that alignment direction. Through computer simulation of this geometry we found that although there is only one azimuthal alignment direction there are in fact two states with similar energies but which differ in how much the LC tilts. FIG. 2 is a schematic of the two states. In one state (shown on the left of FIG. 2) the LC is highly tilted, and in the other it is planar around the posts. The exact nature of the LC orientation depends on the details of the structure, but for a range of parameters there are two distinct states with different tilts. The two states may be distinguished by viewing through a polariser 8 and an analyser 6. The low tilt state has high birefringence and the high tilt state has low birefringence.

Without limiting the scope of the invention in any way, we think that the two states may arise because of the way in which the LC is deformed by the post. Flowing around a post causes regions of high energy density at the leading and trailing edges of the post where there is a sharp change in direction. This can be seen in FIG. 1 at the bottom left and top right corners of the post. This energy density is reduced if the LC molecules are tilted because there is a less severe direction change. This is clear in the limit of the molecules being homeotropic throughout the cell. In that case there is no region of high distortion at the post edges. In the higher tilt state this deformation energy is therefore reduced, but at the expense of a higher bend/splay deformation energy at the base of the posts. The LC in contact with the flat surface between posts is untilted but undergoes a sharp change of direction as it adopts the tilt around the post.

In the low tilt state the energy is balanced in the opposite sense, with the high deformation around the leading and trailing edges of the post being partially balanced by the lack of the bend/splay deformation at the base of the post because the tilt is uniform around the post. Our computer simulations suggest that, for the current configuration, the higher tilt state is the lower energy state.

This is supported by the results of computer simulation and in actual cells. When viewed at an appropriate angle between crossed polarisers the cells always cool into the darker of the two states. From FIG. 2 it would appear that the high tilt state will have lower birefringence and therefore appear darker than the low tilt state. The exact amount of tilt in the high tilt state will be a function of the elastic constants of the LC material and the planar anchoring energy of the post material.

Figure 3:
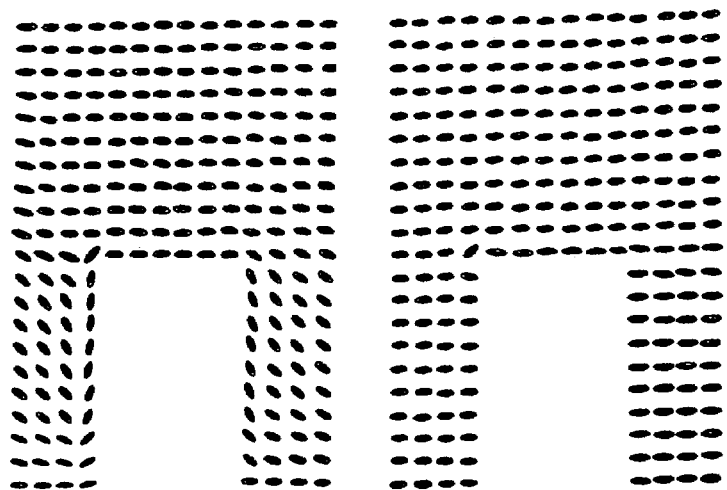
FIG. 3 shows schematic views of a cross section through a single post and the surrounding LC of a bistable nematic device in accordance with another aspect of the present invention, along one of the diagonals of a post, in different states.

Referring now to FIG. 3, there is shown a computer-generated model of LC alignment around a square post similar to that shown in FIG. 2, but with the inner surface of the second cell wall treated to give planar alignment. In the state shown in the left in FIG. 3, the local director is highly tilted, and in the other it is planar around the posts. As with the cell of FIG. 2, switching between the two states is achieved by the application of suitable electrical signals.

Figure 4:
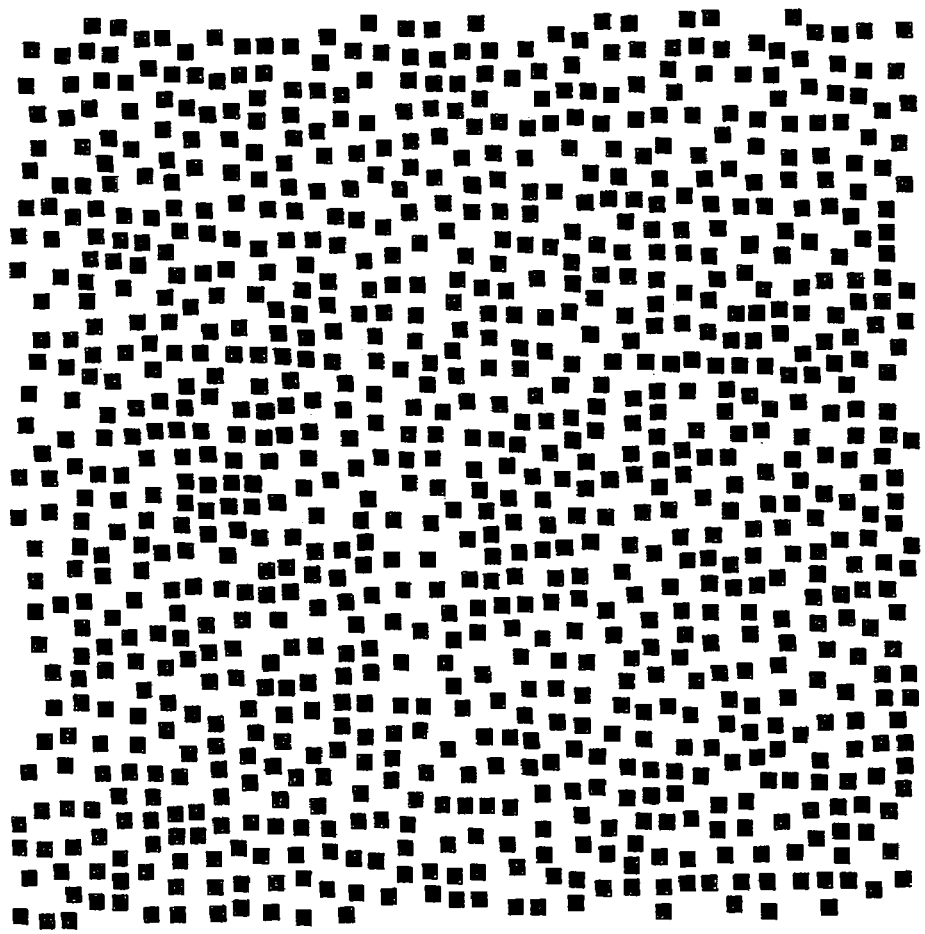
FIG. 4 is a plan view of a unit cell of a device in accordance with the present invention, having posts in a pseudorandom array.

FIG. 4 shows a pseudorandom array of posts for an alternative embodiment of the invention, which provides bistable alignment without interference effects. Each square post is about 0.8×0.8 μm, and the pseudorandom array has a repeat distance of 56 μm.

Cell Manufacture

A clean glass substrate 2 coated with Indium Tin Oxide (ITO) was taken and electrode patterns 12 were formed using conventional lithographic and wet etch procedures. The substrate was spin-coated with a suitable photoresist (Shipley S1813) to a final thickness of 1.3 μm.

A photomask (Compugraphics International PLC) with an array of suitably-dimensioned square opaque regions in a square array, was brought into hard contact with the substrate and a suitable UV source was used to expose the photoresist for 10 s at ~100 mW/cm$^2$. The substrate was developed using Microposit Developer diluted 1:1 with deionised water for approximately 20 s and rinsed dry. The substrate was flood exposed using a 365 nm UV source for 3 minutes at 30 mW/cm$^2$, and hardbaked at 85° C. for 12 hours. The substrate was then deep UV cured using a 254 nm UV source at ~50 mW/cm$^2$ for 1 hour. By exposing through the mask using a UV source at an offset angle to the normal to the plane of the cell wall, tilted posts could be produced. The tilt angle (or blaze angle) is related to the offset angle by Snell's law. Exposure to the developer will also affect the shape of the posts.

A second clean ITO substrate 4 with electrode patterns 14 was taken and treated to give a homeotropic alignment of the liquid crystal using a stearyl-carboxy-chromium complex, in a known manner.

An LC test cell was formed by bringing the substrates together using suitable spacer beads (Micropearl) contained in UV curing glue (Norland Optical Adhesives N73) around the periphery of the substrates 2, 4, and cured using 365 nm UV source. The cell was capillary filled with a nematic liquid crystal mixture (Merck ZLI 4788-000). Methods of spacing, assembling and filling LC cells are well known to those skilled in the art of LCD manufacture, and such conventional methods may also be used in the spacing, assembling and filling of devices in accordance with the present invention.

Experimental Results

Figure 5:
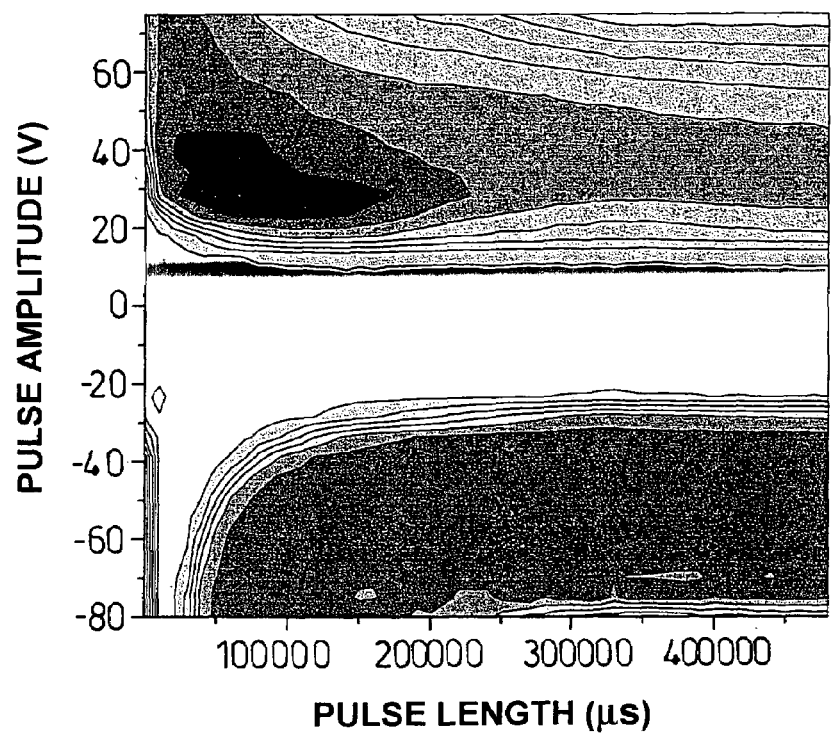
FIGS. 5 and 6 show change in transmission of an experimental cell in accordance with one aspect of the invention, as a function of pulse length and amplitude, for switching between two states.
Figure 6:
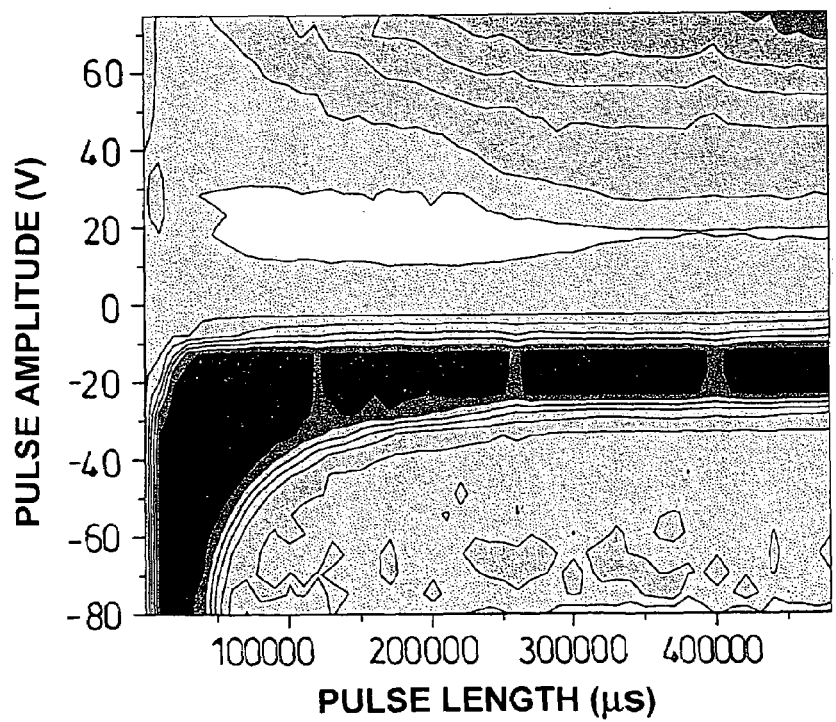

FIGS. 5 and 6 show the switching response of a bistable cell recorded at 42.5° C. and viewed between crossed polarisers. The cell had the following characteristics:

spacing: 3 μm
post height: 1.4 μm
gap between posts: 0.7 μm
offset angle: 12°
LC: ZLI 4788-000 (Merck) doped with 3% N65 (Norland).

It was found that adding a small quantity of surfactant oligomer to the LC improved the switching. It is known that switching in conventional LC devices can be improved by addition of surfactant oligomers to the LC. See, for example, G P Bryan-Brown, E L Wood and I C Sage, *Nature* Vol. 399 p338 1999. We doped the LC with N65 UV-curable glue (from Norland) and cured it while in the isotropic phase. The doped LC was then mass filtered to remove the longer chain lengths. We found that adding 3% by weight of N65 to the LC was optimum.

DC balanced monopolar pulses were applied to the cell and the effect on the transmission was recorded. Each test pulse was of an amplitude V and a duration τ, and was followed by another pulse of opposite polarity but with an amplitude about 5% of V, but a duration 20 times longer. The second pulse was too small to cause switching but did prevent a build up of charge in the cell after many test pulses. FIGS. 5 and 6 show the change in transmission as a function of the pulse length and amplitude. FIG. 5 shows results for switching from the high energy state to the low energy state, and FIG. 6 shows results for switching in the opposite direction. Black indicates that the transmission had changed so that the cell is switched. White indicates no change in transmission so that no switching has occurred.

Switching from the high energy state to the low energy state is generally sign independent indicating that in this direction switching is taking place via the dielectric anisotropy. Switching in the other direction is sign dependent indicating that the switching is mediated by a linear electro-optic effect.

We believe this is likely to be the flexoelectric effect. In FIG. 5, the non-switching region coincides with the switching region in FIG. 6. This suggests that switching from the high energy state to the low energy state is impeded by the flexoelectric effect.

In a series of further experiments we have varied the cell parameters to go some way towards optimising the switching characteristics of the device. A preferred cell structure is: cell gap 3 μm; post size 1 μm; offset angle 5° along one of the diagonals of the post; 1.1 μm coating of s1813; N65 initial concentration 3%.

SEM Studies of Post Arrays

Figure 7:
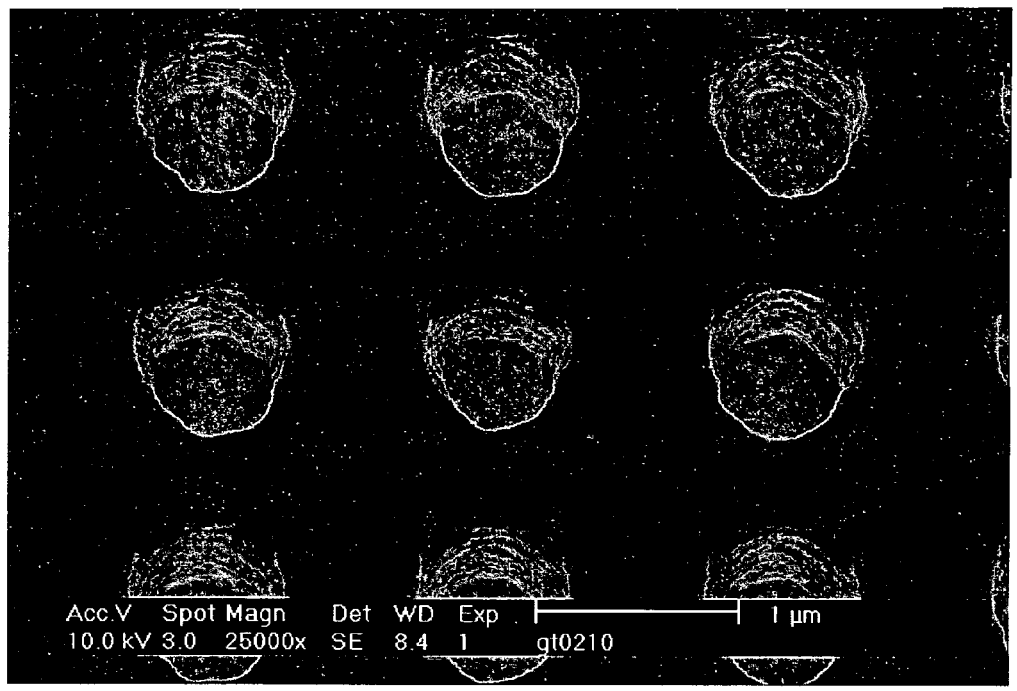
FIGS. 7 to 10 are SEM photomicrographs of arrays of posts used in the manufacture of liquid crystal devices in accordance with the invention.
Figure 8:
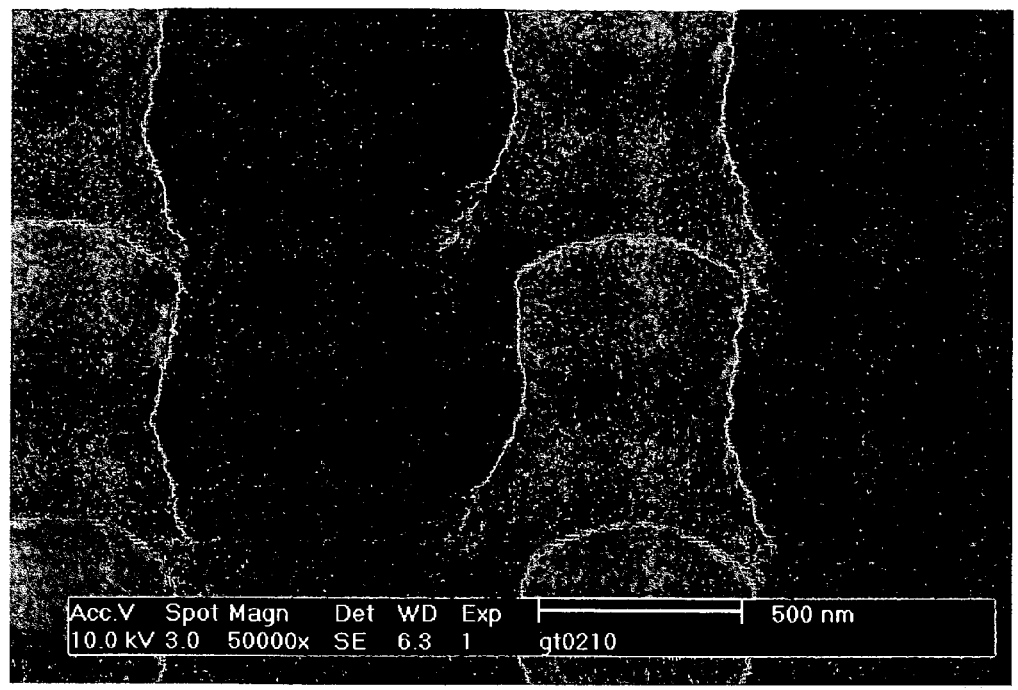
Figure 9:
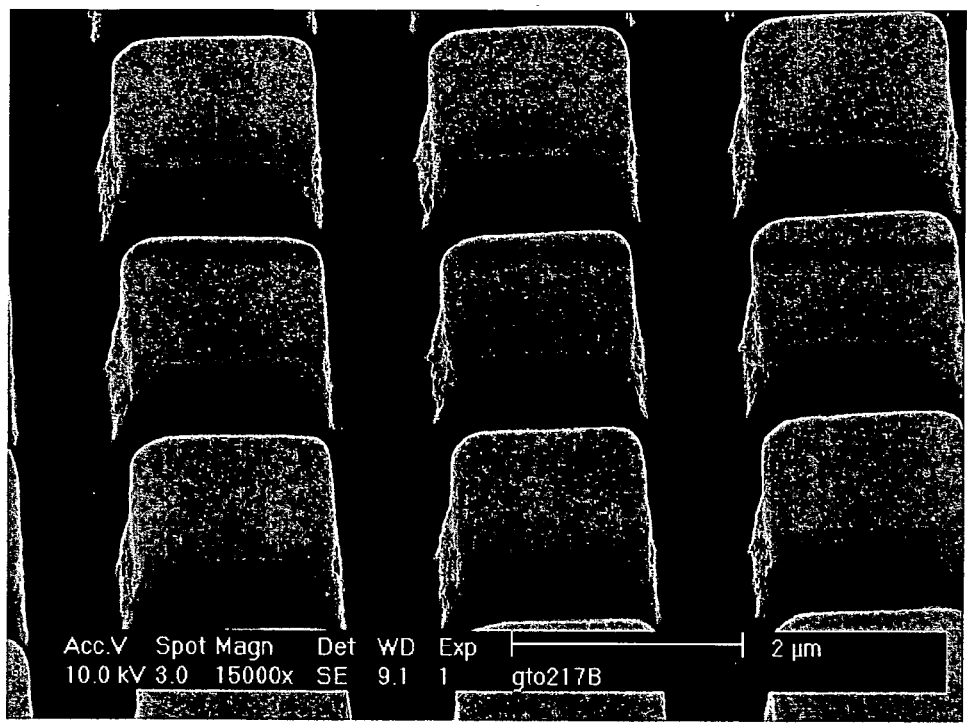

SEMs of experimental post arrays formed using masks with suitable patterns of squares are shown in FIGS. 7 to 10. The posts in FIGS. 7 and 8 were formed using 0.7 μm square opaque regions, 90% s1813, and a 5° offset angle. The alert reader will note that the 0.7 μm "square" posts are not very square, having considerably rounded tops. The bases of the posts are much less rounded than the tops of the posts. This is consistent with the rounding being due to the development process. The tops of the posts are exposed to the developer for a longer time than the bases. They are therefore more susceptible to attack. Even the unexposed resist that makes up the posts will have some finite solubility in the resist, and the effect will be to attack sharp features such as corners first. Larger posts show much less rounding off; for example FIG. 9 shows some 2 μm posts.

The other feature that is particularly obvious in FIGS. 7 and 8 is the ripples up the sides of the posts. It is thought that this is due to interference from light reflected from the substrate, since these arrays of posts were exposed by a 442 nm laser beam. The effect is much less obvious in gratings exposed with a mask aligner which uses a UV lamp that emits multiple wavelengths which are incoherent, reducing the effect of any interference. These ripples do not seem to affect the switching.

Figure 10:
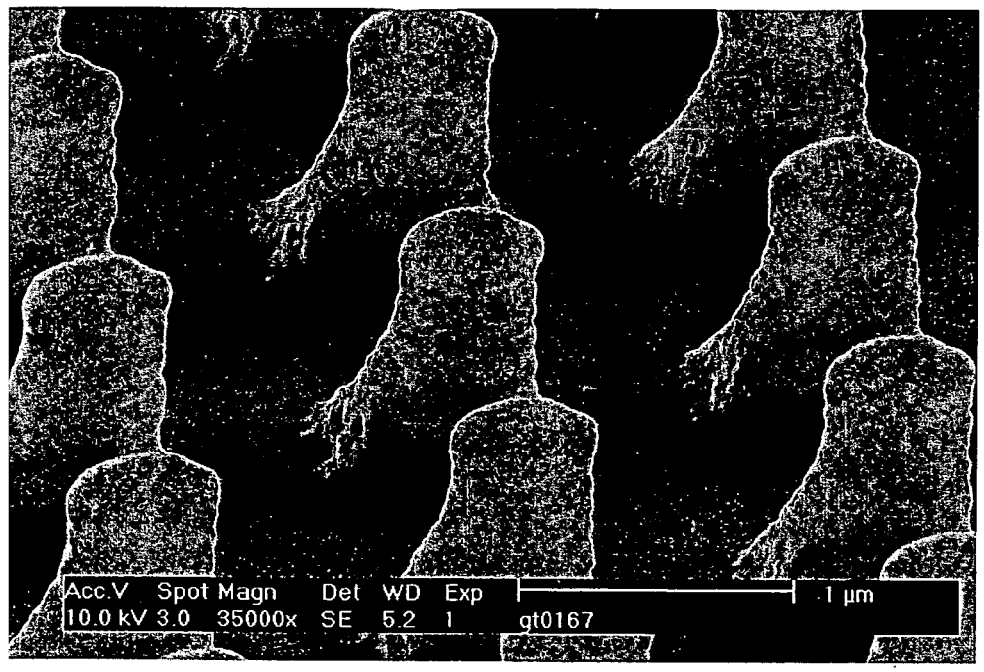

Another interesting feature from the SEMs is the absence of overhangs in even the most blazed posts, for example FIG. 10 shows some 0.7 μm posts exposed at 30 degrees without significant overhang. Again we think any overhangs would be very susceptible to attack by the developer.

Computer Simulations with Rounded Posts

We have generated computer models that look very similar to the 0.7 μm rounded posts of FIGS. 7 and 8. Even though the posts are far from the idealised square posts that we had used in previous simulations, these more realistic posts still give the same states, aligned along the blazed diagonals, but with two different magnitudes of tilt. The energies of the two states are slightly lower than before, but the tilted state still has the lowest energy. It seems that it is not essential to have sharp edges to the posts. The two states are believed to arise because of the way that the LC is distorted around a post (as previously discussed). This will be true whatever the shape of the cross-section of the post. Even cylindrical posts should give the same two zenithal alignments. However, with cylindrical symmetry there is nothing to fix the azimuthal alignment of the LC—all directions will be degenerate. The posts need to have some asymmetry to lift this degeneracy. This could be for example an elliptical, diamond or square cross section with a small amount of blaze.

Computer Simulations of Homeotropic Alignment by Posts

Figure 11:
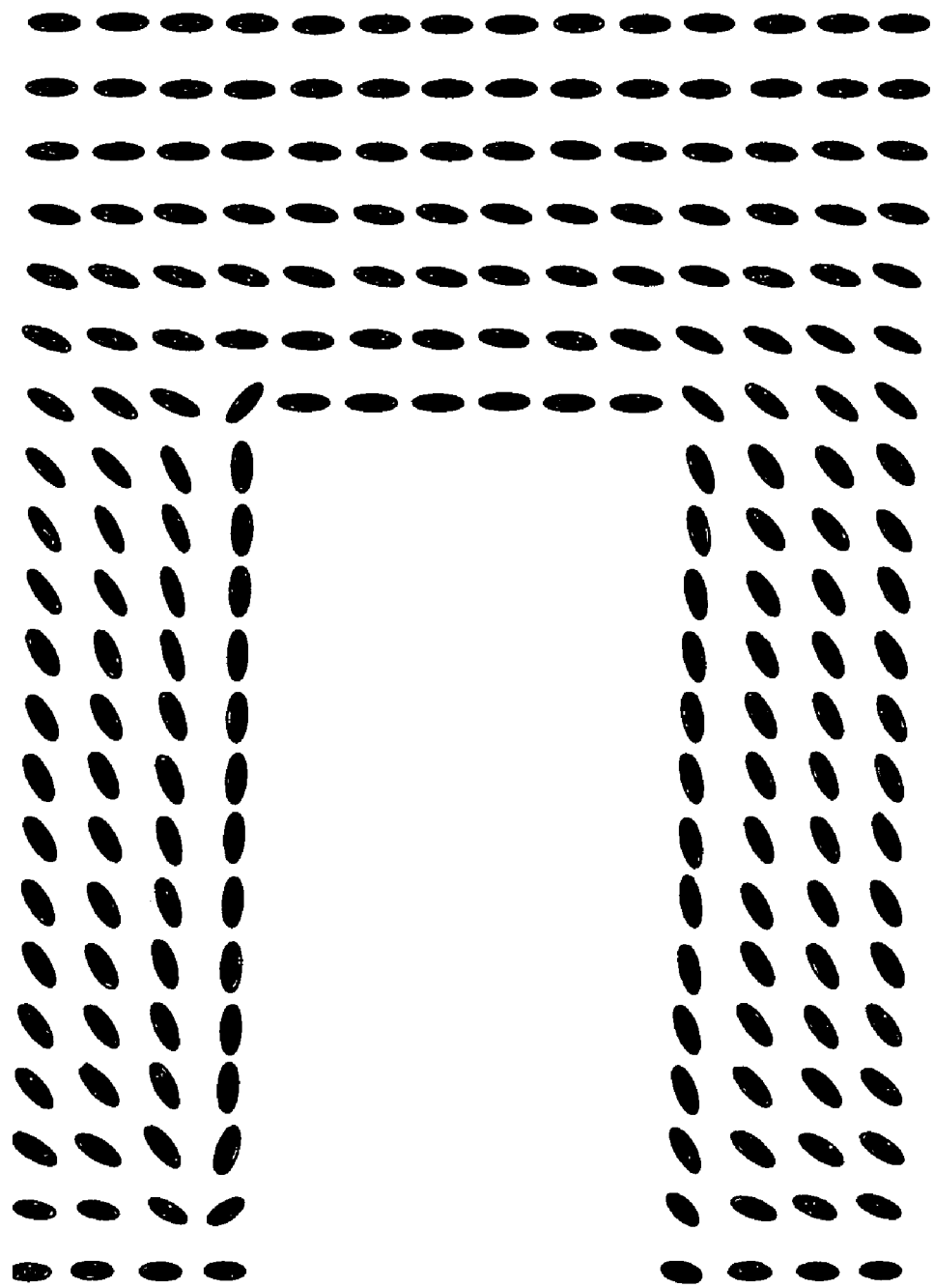
FIG. 11 is a cross section, perpendicular to the cell walls, parallel and near to a side of a post of a device in accordance with a further aspect of the invention.

We have done some computer simulation of the homeotropic alignment by posts. We have modelled 3 μm thick cells with an array of square posts which are 300 nm across on one substrate, with the other substrate flat, but modelled as a material that will give strong planar alignment. We have modelled a variety of post heights and spacings to see when the LC adopts a homeotropic alignment around the posts. FIG. 11 shows a computer simulation side view of a region containing a single post about 1.8 μm tall on the bottom substrate. Around the post the LC is strongly tilted, whilst above the post the alignment is more planar, due to the interaction with the upper substrate.

In the computer simulations we have modelled the effect of varying the post height from 0.2 to 2.6 μm, with the gap between posts varying from 0.6 to 1.2 μm. As post height is increased, the alignment goes from being just planar to being bistable or multistable between the planar state and a more tilted state. As post height is increased further, then the planar state becomes too high in energy and there is just the highly tilted homeotropic state. Present studies indicate that homeotropic alignment begins when the post height is approximately equal to the average post spacing. The effect is expected to persist down to very small cross-section posts. An expected upper limit of the post cross-section for homeotropic alignment is when the post width is of the order of the cell gap.

Figure 12A:
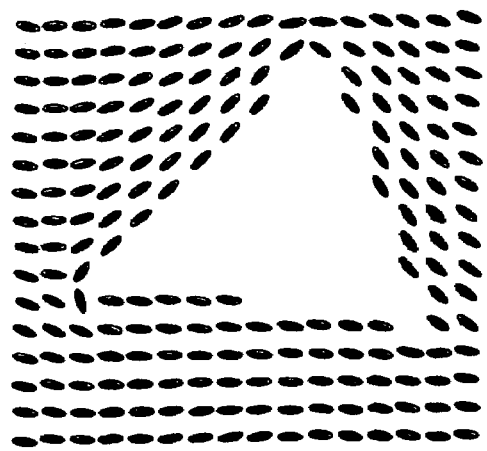
FIGS. 12a-12c show schematic cross sections similar to FIG. 1, for a triangular post.
Figure 12B:
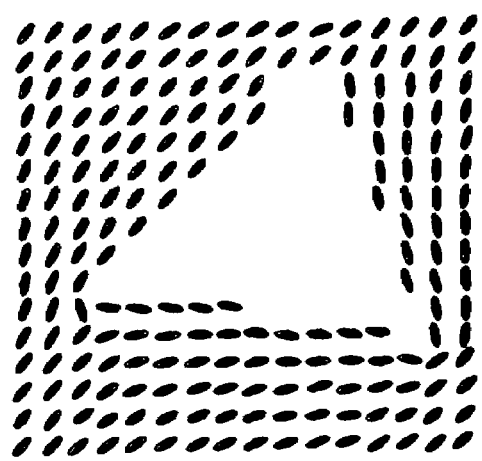
Figure 12C:
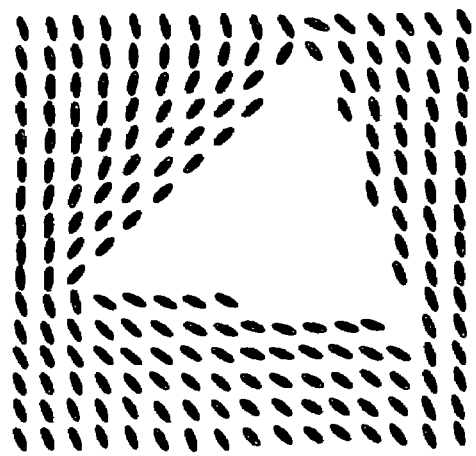
Figure 13A:
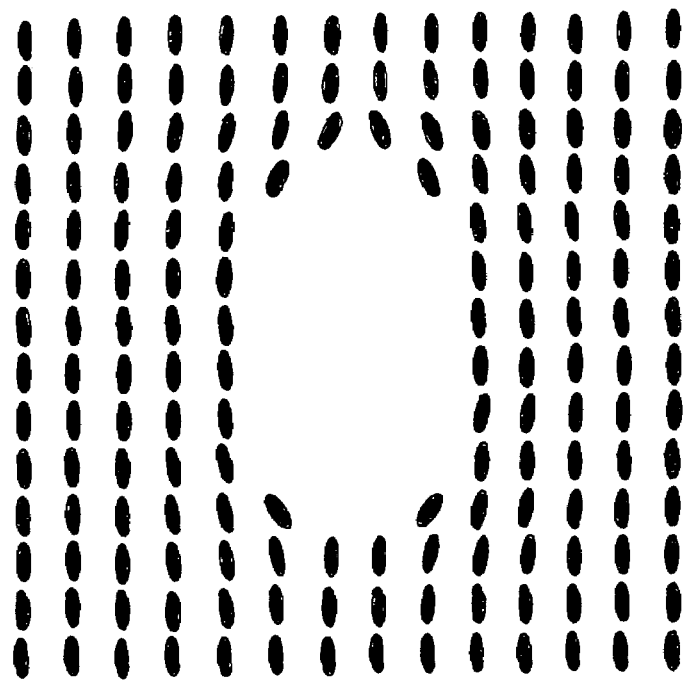
FIGS. 13a-13d show schematic cross sections similar to FIG. 1, for an elliptical post.
Figure 13B:
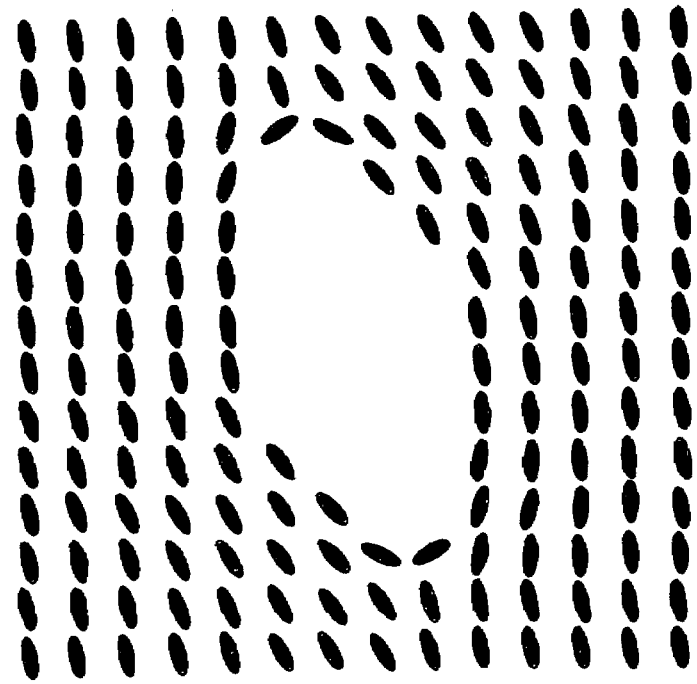
Figure 13C:
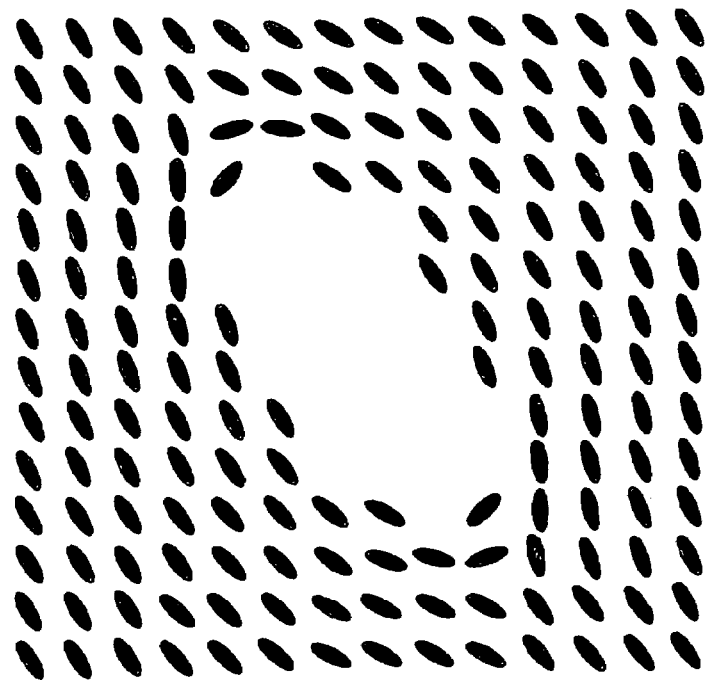
Figure 13D:
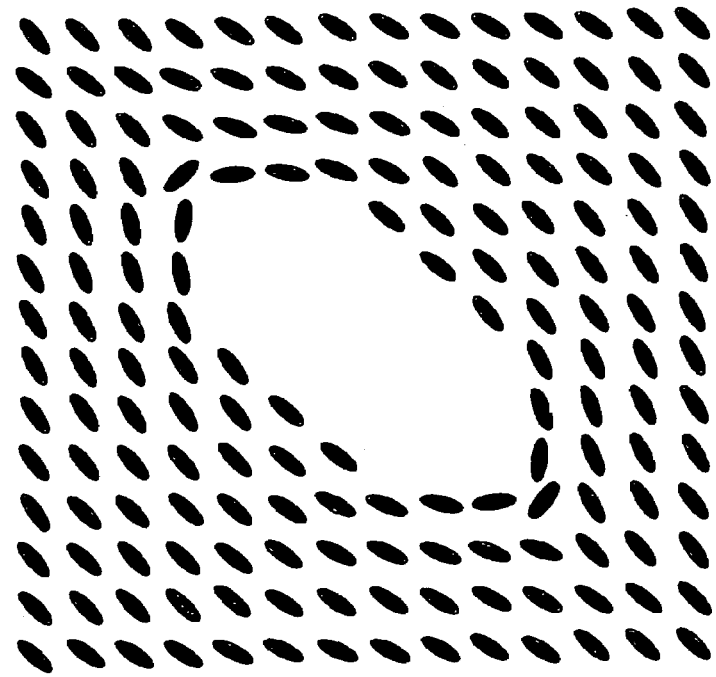

FIG. 12 shows a computer-generated model of LC alignment around a post which has a cross sectional shape that is an equilateral triangle. The model assumes that the view shown is a square unit cell of a square array. Each side of the square is about 1.5 μm long. The post is modelled as being relatively shallow, with about a 1:1 aspect ratio. The bisectors of each triangle are aligned at 20° to axes parallel with the sides of the square array. The local liquid crystal director can adopt one of three azimuthal directions as exemplified in FIGS. 12*a-c*.

That the LC director orientation is determined principally by the shape and orientation of the posts is best illustrated in FIG. 13, which shows square unit cells of a square array of the same dimensions as FIG. 12. The posts are elliptical in cross section. In FIG. 13*a*, the long axis of the ellipse is modelled as being parallel to one of the axes of the array. FIGS. 13*b-d* show how rotation of the posts through, respectively, 15°, 30° and 45° affects the orientation of the LC director. In FIG. 13*a*, the director is aligned with the long axis of the ellipse and with an axis of the array. Progressive rotation of the posts causes progressive rotation of the LC director, although some weak alignment effect from the array is seen for the 15° and 30° post alignments. The director alignment is principally determined by the shape and orientation of the posts. By arranging the posts in a pseudorandom array, for example as shown in FIG. 4, the effects of the array can be removed altogether.

Figure 14:
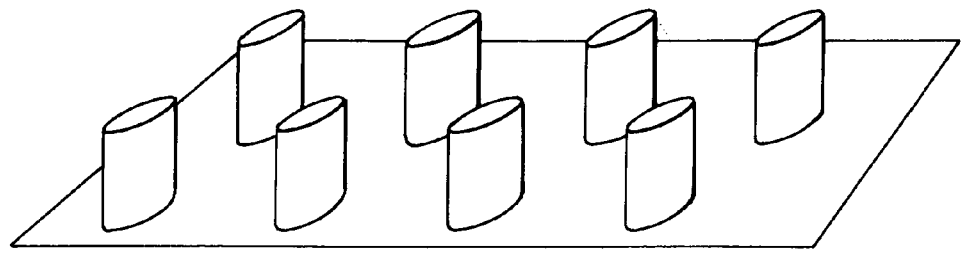
FIGS. 14 to 20 are views of different rays of features of devices in accordance with further embodiments of the invention.
Figure 15:
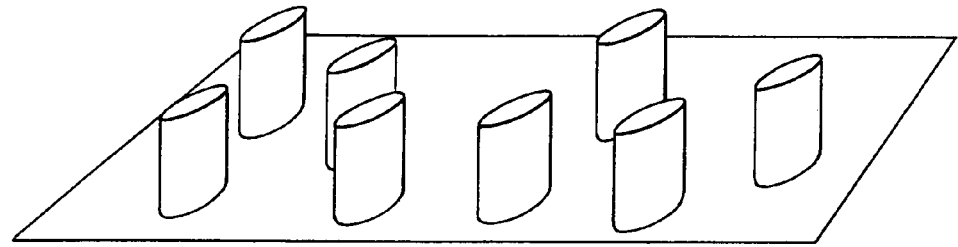
Figure 16:
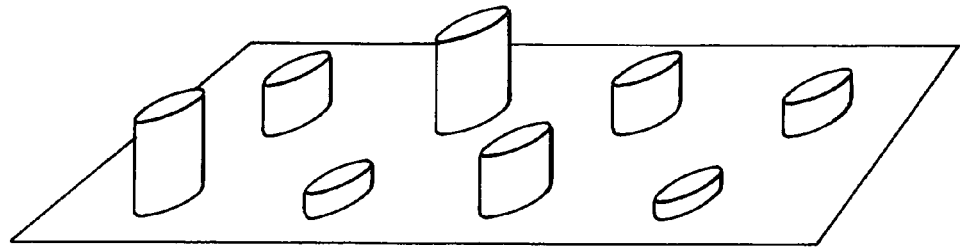
Figure 17:
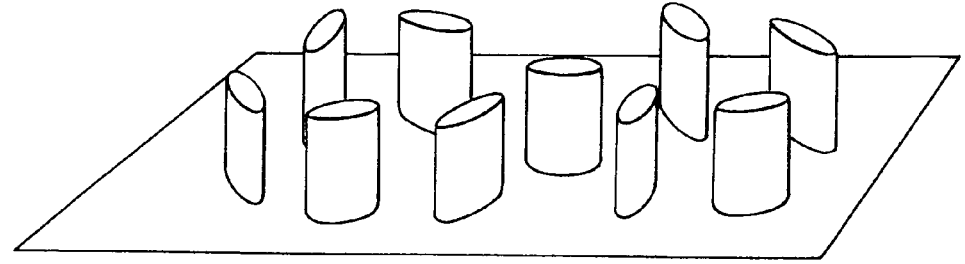
Figure 18:
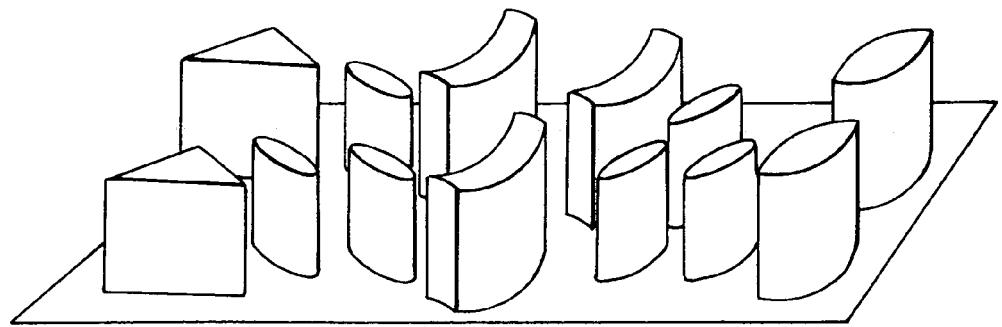
Figure 19:
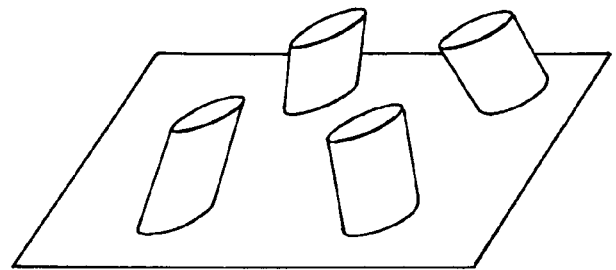
Figure 20:
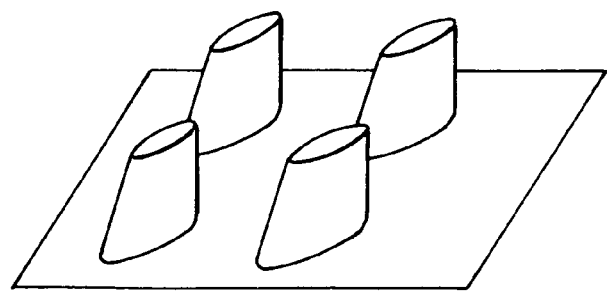

FIGS. 14 to 18 show perspective views of posts of devices in accordance with alternative embodiments of the invention. In FIG. 14, elliptical posts are arranged in a regular array. The posts are all of the same height and arranged with their long axes parallel to each other. Depending on the aspect ratio this produces a uniform director alignment in a single azimuthal direction. Depending on their height, the posts produce either a uniform planar alignment, a bistable or multistable alignment (planar or tilted), or a homeotropic alignment (which may be tilted). The posts in FIG. 15 are similar but in a random array, which substantially eliminates interference effects. The posts may be of non-uniform cross section, as shown in FIG. 20, or they may have overhang for example as shown in FIG. 19. In FIG. 16, the posts are in a regular array, but are of different heights in different regions. This will result in higher tilt in the regions where the posts are higher, and therefore different optical effects. In a HAN display mode, for example, a more tilted alignment will switch at lower voltages. In FIG. 17, elliptical posts are randomly orientated, providing an alignment structure in which there is no strongly preferred long range orientation of the nematic director. It is envisaged that this structure and others like it may be used with an LC material of positive dielectric anisotropy in a display with a scattering mode. FIG. 18 illustrates an arrangement of posts of a plurality of shapes and sizes which may be used to give controlled alignment in different areas, and different effects such as greyscale. The posts in FIG. 19 are tilted at different angles in different regions of the display, thereby producing different tilt angles in the LC alignment and the possibility of producing a greyscale, for example in a HAN mode.

The invention claimed is:

1. A liquid crystal device comprising:
   a first cell wall and a second cell wall enclosing a layer of liquid crystal material;
   electrodes for applying an electric field across at least some of said liquid crystal material; and
   a surface alignment structure on an inner surface of at least said first cell wall, providing a single desired uniform alignment to a liquid crystal director,
   wherein said alignment is selected from the group consisting of planar, tilted and homeotropic,
   wherein said surface alignment structure comprises a two-dimensional array of alignment posts having a random or pseudorandom spacing therebetween, and
   wherein said alignment posts are formed from a material selected from the group consisting of a photoresist material and a plastics material, and are shaped and oriented to produce the desired alignment.

2. A device as claimed in claim 1, wherein said posts have a height in the range of about 0.5 to 5 μm.

3. A device as claimed in claim 1, wherein said posts have a height in the range of about 1.0 to 1.2 μm.

4. A device as claimed in claim 1, wherein at least part of a side wall of said posts is tilted with respect to the normal to the plane of the first cell wall.

5. A device as claimed in claim 1, wherein each post has a width in the range of about 0.2 to 3 μm.

6. A device as claimed in claim 1, wherein said posts are spaced from about 0.1 to 5 μm apart from each other.

7. A device as claimed in claim 1, wherein the liquid crystal material contains a surfactant.

8. A device as claimed in claim 1,
   wherein said two-dimensional array of alignment posts includes a first alignment post and a second alignment post, and
   wherein said first and second alignment posts are of at least one of a different height from one another, a different shape from one another, a different tilt from one another and a different orientation from one another.

9. A device as claimed in claim 1, wherein said liquid crystal material is a nematic liquid crystal.

10. A device as claimed in claim 1, further comprising one or more spacer posts, said one or more spacer posts spanning the entire cell.

11. A device as claimed in claim 1, wherein said posts are not treated with or formed from a material which will induce local homeotropic alignment in the liquid crystal material.

12. The liquid crystal device of claim 1, wherein said alignment posts are produced by casting.

13. The liquid crystal device of claim 1, wherein said alignment posts are produced by a technique selected from the group consisting of embossing and injection moulding.

14. The liquid crystal device of claim 1, wherein said two-dimensional array of alignment posts includes a first alignment post that when viewed from above, has a cross-sectional shape selected from the group consisting of a triangle, a square, a circle, an oval, an ellipse and a polygon.

15. The liquid crystal device of claim 1, wherein said two-dimensional array of alignment posts includes a first alignment post that is pyramid-shaped.

16. The liquid crystal device of claim 1, wherein said two-dimensional array of alignment posts includes a first alignment post that has an irregular surface.

17. The liquid crystal device of claim 1, wherein said two-dimensional array of alignment posts includes a first alignment post that has a curved length-wise face.

18. The liquid crystal device of claim 1, wherein said two-dimensional array of alignment posts includes a first alignment post that has less than two planes of reflection symmetry that are normal to said surface of said first cell wall.

19. A cell wall for use in manufacturing a liquid crystal device, comprising:
    a wall structure having a surface alignment structure on a surface thereof, for providing a single desired uniform alignment to a liquid crystal director,
    wherein said alignment is selected from the group consisting of planar, tilted and homeotropic,
    wherein said surface alignment structure comprises a two-dimensional array of alignment posts having a random or pseudorandom spacing therebetween, and
    wherein said alignment posts are formed from a material selected from the group consisting of a photoresist material and a plastics material, and are shaped and oriented to produce the desired alignment.

20. The cell wall of claim 19, wherein said alignment posts are produced by casting.

21. The cell wall of claim 19, wherein said alignment posts are produced by a technique selected from the group consisting of embossing and injection moulding.

22. The cell wall of claim 19, wherein said two-dimensional array of alignment posts includes a first alignment post that when viewed from above, has a cross-sectional shape selected from the group consisting of a triangle, a square, a circle, an oval, an ellipse and a polygon.

23. The cell wall of claim 19, wherein said two-dimensional array of alignment posts includes a first alignment post that is pyramid-shaped.

24. The cell wall of claim 19, wherein said two-dimensional array of alignment posts includes a first alignment post that has an irregular surface.

25. The cell wall of claim 19, wherein said two-dimensional array of alignment posts includes a first alignment post that has a curved length-wise face.

26. The cell wall of claim 19, wherein said two-dimensional array of alignment posts includes a first alignment post that has less than two planes of reflection symmetry that are normal to said surface of said cell wall.

27. The cell wall of claim 19,
wherein said two-dimensional array of alignment posts includes a first alignment post and a second alignment post, and
wherein said first and second alignment posts at least one of a different height from one another, a different shape from one another, a different tilt from one another and a different orientation from one another.

28. A liquid crystal device comprising:
a first cell wall and a second cell wall enclosing a layer of liquid crystal material;
electrodes for applying an electric field across at least some of said liquid crystal material; and
a surface alignment structure on an inner surface of at least said first cell wall, providing a single desired uniform alignment to a liquid crystal director,
wherein said alignment is selected from the group consisting of planar, tilted and homeotropic,
wherein said surface alignment structure comprises a two-dimensional array of alignment posts having a random or pseudorandom spacing therebetween, and
wherein said alignment posts are shaped and oriented to produce the desired alignment, and have a height in a range of about 0.5 to 5 μm.

29. A device as claimed in claim 28, wherein said posts have a height in the range of about 1.0 to 1.2 μm.

30. A device as claimed in claim 28, wherein at least part of a side wall of said posts is tilted with respect to the normal to the plane of the first cell wall.

31. A device as claimed in claim 28, wherein each post has a width in the range of about 0.2 to 3 μm.

32. A device as claimed in claim 28, wherein said posts are spaced from about 0.1 to 5 μm apart from each other.

33. A device as claimed in claim 28, wherein said posts are formed from a photoresist or a plastics material.

34. A device as claimed in claim 28, wherein the liquid crystal material contains a surfactant.

35. A device as claimed in claim 28,
wherein said two-dimensional array of alignment posts includes a first alignment post and a second alignment post, and
wherein said first and second alignment posts are of at least one of a different height from one another, a different shape from one another, a different tilt from one another and a different orientation from one another.

36. A device as claimed in claim 28, wherein said liquid crystal material is a nematic liquid crystal.

37. A device as claimed in claim 28, further comprising one or more spacer posts, said one or more spacer posts spanning the entire cell.

38. The liquid crystal device of claim 28, wherein said alignment posts are produced by casting.

39. The liquid crystal device of claim 28, wherein said alignment posts are produced by a technique selected from the group consisting of embossing and injection moulding.

40. The liquid crystal device of claim 28, wherein said two-dimensional array of alignment posts includes a first alignment post that when viewed from above, has a cross-sectional shape selected from the group consisting of a triangle, a square, a circle, an oval, an ellipse and a polygon.

41. The liquid crystal device of claim 28, wherein said two-dimensional array of alignment posts includes a first alignment post that is pyramid-shaped.

42. The liquid crystal device of claim 28, wherein said two-dimensional array of alignment posts includes a first alignment post that has an irregular surface.

43. The liquid crystal device of claim 28, wherein said two-dimensional array of alignment posts includes a first alignment post that has a curved length-wise face.

44. The liquid crystal device of claim 28, wherein said two-dimensional array of alignment posts includes a first alignment post that has less than two planes of reflection symmetry that are normal to said surface of said first cell wall.

* * * * *